United States Patent [19]

Lui

[11] Patent Number: 4,901,569

[45] Date of Patent: Feb. 20, 1990

[54] MOTION SENSORS

[75] Inventor: Ming-Wah Lui, Kwun Tong, Hong Kong

[73] Assignee: Keystone Electronics Company Limited, Hong Kong, Hong Kong

[21] Appl. No.: 241,716

[22] Filed: Sep. 8, 1988

[51] Int. Cl.⁴ .............................................. G01P 15/08
[52] U.S. Cl. ..................... 73/517 R; 340/429; 73/431
[58] Field of Search ..................... 73/517 R, 652, 654, 73/431; 340/424, 566, 669, 467; 324/207, 208, 228

[56] References Cited

U.S. PATENT DOCUMENTS

| | | | |
|---|---|---|---|
| 4,028,567 | 6/1977 | Maillot | 340/566 |
| 4,418,337 | 11/1983 | Bader | 340/566 |
| 4,498,341 | 2/1985 | Breitback et al. | 73/517 R |
| 4,584,569 | 4/1986 | Lopez et al. | 340/429 |
| 4,684,928 | 8/1987 | Takahashi et al. | 340/429 |
| 4,754,644 | 7/1988 | Valentini | 73/517 R |
| 4,788,526 | 11/1988 | Eckstein et al. | 340/467 |

Primary Examiner—John Chapman
Assistant Examiner—Robert P. Bell
Attorney, Agent, or Firm—Gregory P. Kaihoi; James R. Haller; Mary P. Bauman

[57] ABSTRACT

A motion sensor comprising a permanent magnet suspended in pendulum fashion at one end of a length of cord string so as to be capable of swinging freely within an electrical coil when the motion sensor is moved. The movement of the magnet induces an emf in the coil which can be detected by simple electronic circuitry. The motion sensor is extremely simple but yet highly effective to detect both shock movement or a gentle motion.

6 Claims, 1 Drawing Sheet

U.S. Patent  Feb. 20, 1990  4,901,569
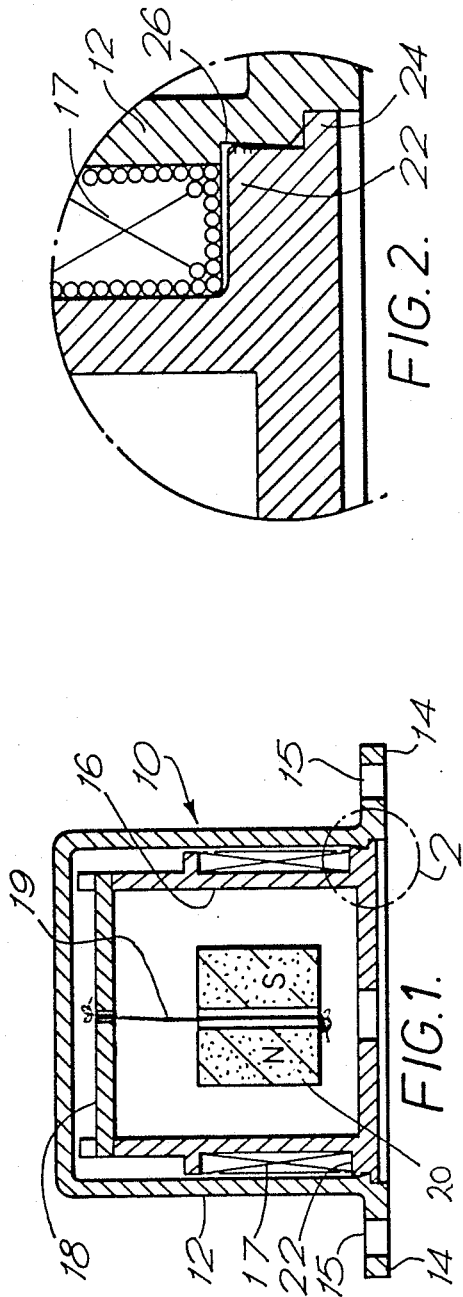
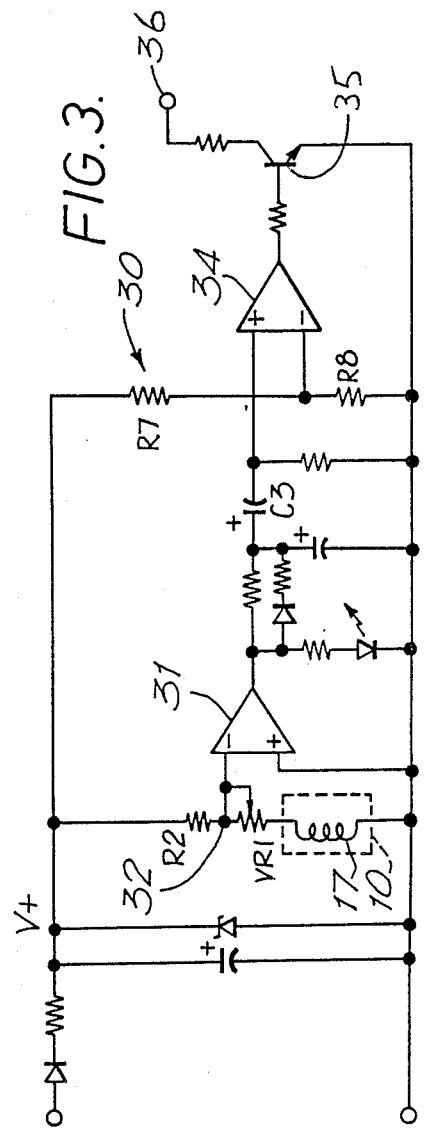

MOTION SENSORS

This invention relates to motion sensors and in particular those motion sensors which are particularly useful for detecting motion as part of a car alarm system.

BACKGROUND TO THE INVENTION

Various forms of simple motion sensors are known but previously known forms of motion sensors cannot detect both sudden shock movements and gentle motion movements.

Sudden shocks can be detected by means of a sensor comprising a piezo-electric crystal which is arranged to be hit by a freely suspended weight when a sudden movement occurs. The resulting electrical output from the piezo-electric crystal is used to detect the shock but such a detector may not react to gentle movements. Another form has a weight at the end of a spring arm or spring. An example of such a sensor is shown in U.S. Pat. No. 3,649,787. Sudden movements will cause the spring to bend because of the inertia of the weight and this causes closing of an electrical switch for a short while which is detected electrically. Such a motion sensor may not be effective in detecting gentle movements however, since the spring has to have reasonable stiffness to support the weight and restore it to its centre rest position and the stiffer the spring the less sensitive the device is to gentle movements.

Another somewhat similar device is shown in U.S. Pat. No. 4,418,337. Here a small magnet is mounted on a spring and the magnet is positioned within an electrical coil. Movement of the magnet is detected by monitoring the emf generated in the coil by the movement of the magnet. This device however is designed to detect lack of movement rather than movement. Thus it is designed to be carried by say a fireman and, should he be overcome by fumes or the like and rendered unconscious, then the magnet must quickly be damped, in other words the spring must be quite stiff, so that the lack of a generated emf in the coil can be detected and the alarm given. The teaching of this Patent is therefore quite contrary to the detection of slight and gentle movements.

An example of a motion detector which will detect gentle movements but not always a sudden shock comprises an electrically conductive ball rolling over a printed circuit board, movement of the ball causing it to form a conducting path between different conductive areas on the printed circuit board which can then be detected electrically. Alternatively, a mercury switch where a drop of mercury can move within a glass bulb can be used, motion causing the drop to move to a position where it completes a conductive path between two electrical contacts. Sudden shock may however fail to be detected since the conductive path may well fail to be completed.

All these types of motion sensor therefore will only be effective in detecting either sudden shock motion or gentle continuous motion. It is therefore an object of the present invention to provide a simple motion sensor which is capable of detecting any sort of motion, whether it be a continuous, gentle motion or whether it be a sudden shock movement.

BRIEF SUMMARY OF THE INVENTION

According to the invention, the motion sensor comprises a permanent magnet suspended in pendulum fashion at one end of flexible and substantially inextensible hanger means such as a length of cord or string, the magnet being positioned so as to be capable of swinging within an electrical coil, and motion is then detected by detecting output voltages from the coil.

Such a motion sensor is extremely simple but yet highly effective. The magnet which is suspended from the hanger means is free to move and will do so whether the motion be a shock movement or a gentle motion. The direction of movement is also largely irrelevant since, the permanent magnet is free to move upon the slightest movement and this will create an emf in the coil which can be detected by appropriate electronic circuitry.

The resulting motion sensor can be extremely compact since the magnet can be very small. Also the sensor can be very simple since the link can be a simple piece of string, cord or the like, although it could be a rigid link such as a length of wire or a rod-like member provided it is supported from a flexible hinge or the like.

Because the sensor can be very compact, it can be used in, for example, car alarms where it is desirable to provide a relatively compact device to be fitted in some appropriate position within the car so as not to be visible or obtrusive.

The resulting emf or voltage output from the coil can be detected easily by electronic circuitry which can, for example, comprise an amplifier and a comparator to compare the amplified output with a substantially constant voltage and detect changes, whether they be small or large, sudden or progressive. Appropriate circuitry is readily available in the form of integrated chips and so the circuitry associated with the motion sensor of the invention to detect motion can be extremely compact, simple and relatively inexpensive. It is therefore possible to incorporate such circuitry together with the motion sensor relatively compactly in car alarms.

In one particular embodiment of the invention, the motion sensor comprises a cylindrical housing surrounding a cylindrical coil within which the permanent magnet is suspended at one end of a short length of string and the whole housing need be no more than 2 to 3 centimeters in diameter and 1.5 to 2.5 centimeters in length.

BRIEF DESCRIPTION OF THE DRAWINGS

An example of a motion sensor, according to the invention, will now be described with reference to the accompanying drawings, in which:

FIG. 1 is an upright section through the sensor;

FIG. 2 is an enlarged detail of the area circled and marked 2 in FIG. 1; and

FIG. 3 is a diagram of a circuit capable of detecting voltage outputs from the coil of the sensor.

DESCRIPTION OF THE PREFERRED EMBODIMENT

The motion sensor 10 shown in the drawings includes an outer housing 12 in the form of a cylindrical can of synthetic plastics material. At its base, the housing has outwardly directed lugs 14 through which are provided holes 15 to screw the sensor onto a suitable backing such as a printed circuit board forming part of a car alarm.

Within the housing 12 is positioned a cylindrical plastics material reel 16 around which is wound an electrical coil 17. Suitably this coil can be made up of 1,000 turns of wire of 44 gauge in thickness.

The reel 16 extends upwardly beyond the coil and has a cross-bar 18. Suspended from the centre of this, by a length of string 19 is a small permanent magnet 20. The permanent magnet can be for example a piece of permanently magnetised ferro-magnetic material, e.g. of a mass of the order of 12 grams.

As will be appreciated, when the motion sensor 10 is subject to movement, whether sudden or gentle, the inertia of the magnet 20 will cause it to attempt to remain stationary relative the movement of the outer housing 12. Thus if the sensor is hit with a sudden force, the housing and coil 17 will move relative the magnet and an emf will be produced, even if the shock movement is too sudden to be seen by the human eye. If on the other hand the movement is gentle, the magnet will swing in pendulum fashion and again generate an emf in the coil. This movement of the magnet within the coil will automatically create an emf across the terminals of the coil 17.

As best shown in FIG. 2 the lower end of the reel 16 has an outwardly directed flange 22 defining the lowermost end of the coil 17. That flange 22 has a supplementary flange 24 extending out from its lower end. The flange 22 seats in an undercut circular recesss 26 in the lower end of the housing 12 so that for ease of assembly the completed reel 16 carrying the coil 17 and the magnet 20 can be wedged into the open end of the housing 12.

FIG. 3 shows an electronic circuit 30 for detecting the motion or, in other words, the output emf from the coil 17.

It comprises an amplifier 31, suitably in the form of an IC chip, for amplifying the output from the coil 17 which is positioned in series with resistors R2 and VR1 across the electrical supply so that when an emf is produced in the coil, this will change the potential at the point 32 which is the input to the amplifier 31. The variable resistor VR1 controls the sensitivity of the circuit.

The output from the amplifier 31 is coupled through a capacitor C3 to a comparator circuit 34 which also has a constant input potential provided by resistors R7 and R8. In the event of the comparator 34 detecting a change in the amplified output emf from the amplifier 31 relative the constant voltage input, an output is provided through a resistor R9 to turn on a transistor 35 to provide an output at point 36. Suitable IC circuits for both the amplifier 31 and comparator 34 are well known and are not felt to require any further description.

The output signal at the point 36 can then be used to signal the motion detected by the motion sensor 10 for use in some other form of apparatus. One example of apparatus with which the motion sensor 10 of the invention is particularly useful is a car alarm such that the presence of an output signal at the output 36 can be used with conventional car alarm circuitry to, for example, trigger the sounding of a horn of a car or to immobilize the electrical system of the car in the event of unauthorised entry into the car.

A lattitude of modification, change and substitution is intended in the foregoing disclosure and in some instances some features of the invention will be employed without a corresponding use of other features. Accordingly it is appropriate that the appended claims be construed broadly and in a manner consistent with the spirit and scope of the invention herein.

I claim:

1. A motion sensor comprising:
   (i) a hollow reel of non-magnetic material having an upper end and a lower end,
   (ii) a length of wire wound around said reel to form an electrical coil,
   (iii) support means extending across said upper end of said reel,
   (iv) flexible but substantially inextensible hanger means having an upper end attached to said support means and having a lower end hanging down within said hollow reel,
   (v) a permanent magnet attached to said lower end and suspended within the hollow reel and movable in pendulum fashion relative the support means,
   (vi) detecting means linked to said coil for detecting voltages induced in said coil by pendulum movement of said magnet within said reel when motion is imparted to said motion sensor, and
   (vii) an outer cylindrical housing closed at one end and open at the other end and enclosing said reel, said reel being wedged into said open end of said housing to secure it within said housing.

2. A motion sensor according to claim 1 further comprising an upward extension from said reel, and in which said support means comprise a cross member extending across said upward extension, the hanger means being attached by its said upper end to the said cross member member extending across said upward extension and hanging down therefrom.

3. A motion sensor according to claim 1 in which said hanger means comprise an elongate flexible member of substantially constant cross-section.

4. A motion sensor according to claim 2 in which the hanger means comprise a length of cord or string.

5. A motion sensor according to claim 3 in which the hanger means comprise a length of cord or string.

6. A motion sensor according to claim 1 in which said detecting means comprise an amplifier connected to said coil, and a comparator for comparing the amplified output from said coil with a substantially constant voltage, the comparator providing an output signal when differences between the amplified output and the substantially constant voltage are detected.

* * * * *